United States Patent [19]

Slobodzian et al.

[11] 4,148,073
[45] Apr. 3, 1979

[54] HIGH SPEED VIDEO DISPLAY SYSTEM INCLUDING ZOOM FEATURE

[75] Inventors: Gregory E. Slobodzian, Chicago; Robert A. Payne, Des Plaines; Wayne Fiedler, Chicago Ridge, all of Ill.

[73] Assignee: Stewart-Warner Corporation, Chicago, Ill.

[21] Appl. No.: 865,329

[22] Filed: Dec. 28, 1977

[51] Int. Cl.² ............................................. H04N 3/12
[52] U.S. Cl. .................................... 358/240; 358/180
[58] Field of Search ................................ 358/240, 180

[56] References Cited

U.S. PATENT DOCUMENTS

| | | | |
|---|---|---|---|
| 3,941,926 | 3/1976 | Slobodzian et al. | 358/240 |
| 3,961,365 | 6/1976 | Payne et al. | 358/240 |
| 4,009,335 | 2/1977 | Payne et al. | 358/240 |

Primary Examiner—Richard Murray
Attorney, Agent, or Firm—McDougall, Hersh & Scott

[57] ABSTRACT

A high speed video display system suitable for use in operating video scoreboard displays is disclosed. Video data for a complete frame is converted from analogue to digital format and is directly loaded into a display memory (RAM). The digitized data is then outputted via a display interface to the display board which may consist of variable intensity devices, such as, incandescent light bulbs. The system, although under computer control, does not include the computer in the data handling path thereby permitting increased data handling rates. The video converter for the system includes circuits for changing the display format to produce "zoom" enlargements and wide screen displays suitable for racetrack applications.

21 Claims, 12 Drawing Figures

STD MODE

CLK RATE: $\frac{MCLK}{2}$

FIELD USAGE:
  EVERY OTHER LINE
  IN 1 FIELD

DISPLAY BD:
  L PIXELS LONG

ZOOM MODE

CLK RATE: MCLK

FIELD USAGE:
  EVERY LINE IN
  1 FIELD

DISPLAY BD:
  L PIXELS LONG

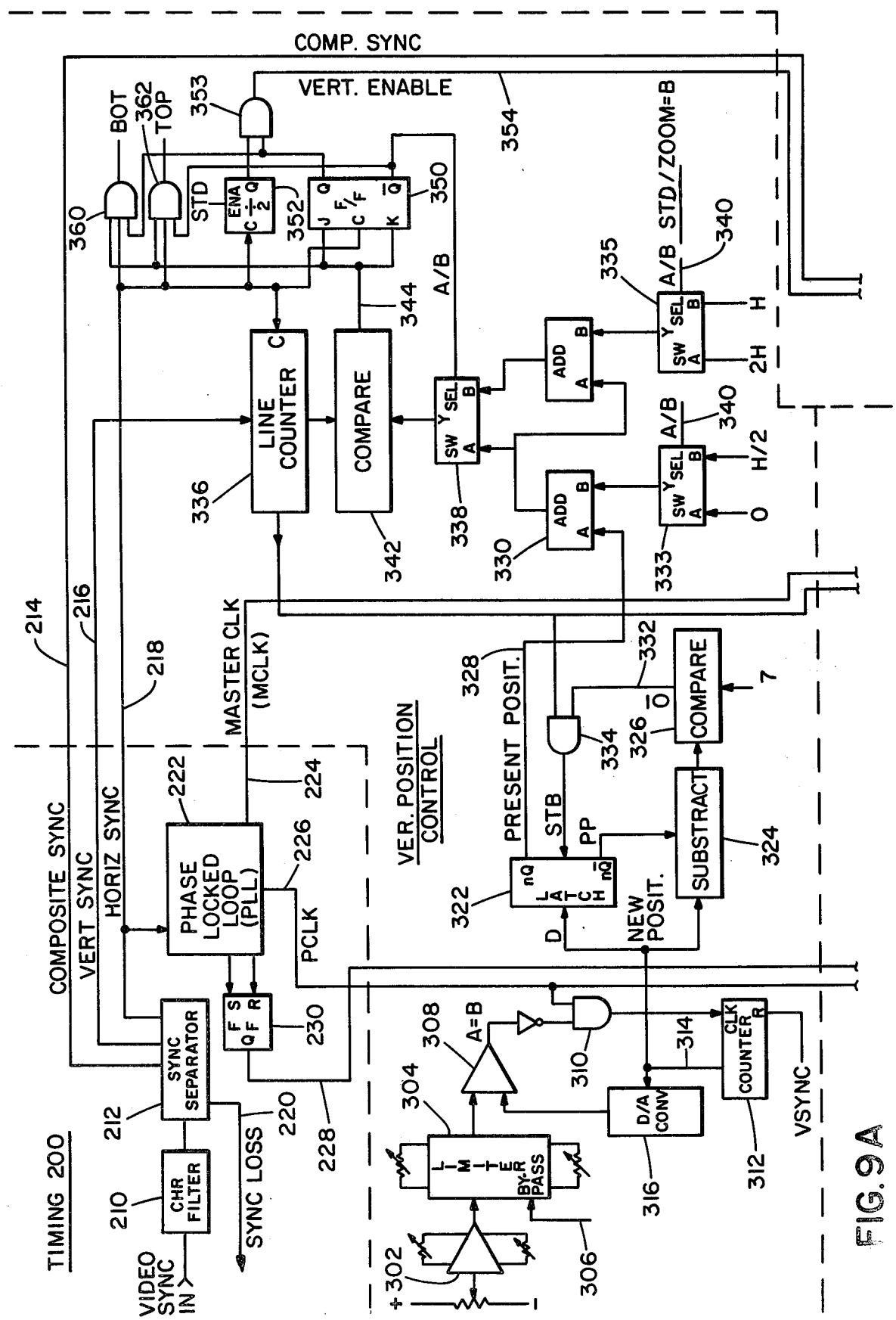

HIGH SPEED VIDEO DISPLAY SYSTEM INCLUDING ZOOM FEATURE

BACKGROUND OF THE INVENTION

This invention relates to the field of large video display systems of the type appropriate for installation at a stadium. Such displays are usually formed by a large matrix of variable intensity display devices as, for example, incandescent bulbs, which are driven by a display system usually computer controlled. The display system receives a video input, such as the line feed from a network broadcast or a video tape recording and digitizes the video information into a complete frame of digital data. In prior systems the digitized data was stored in a computer memory and then at an appropriate point transferred from memory to the display device. Computers utilized for such a system include the Digital Equipment Corporation PDP Series 8. Although such mini computers are relatively powerful devices, their data transfer rate, as compared in random access memories, is low. As a result the computer represents a limiting element in the system with respect to the rate at which data can be digitized and transferred to the display device thereby limiting the versatility of the system with respect to other desirable features, such as maintaining statistics on participants, displaying caricatures, cartoons, or still photographs of the players.

It is therefore a desirable objective to retain computer control of the display system but to remove the computer from the data path to the display board. The PDP computer referred to employs data break cycles to transmit information to the display board. It does not have time to do the other tasks as mentioned, such as disk storage input and output, statistical updating and message inputting in addition to refreshing the display. Furthermore, when the computer is included in the data path it is necessary to synchronize the computer to the master clock. This slows down processor time still further.

It is accordingly an object of the present invention to provide a display system which is capable of higher speed than prior devices by virtue of removing the computer from the data path. By so doing the computer is able to perform a variety of other tasks as indicated. More importantly, it is possible to obtain a heretofore unavailable display in which a portion of the video picture being displayed can be enlarged to permit better viewing thereof. Often this is analogized to "zooming" in the manner permitted by an adjustable lens in photography. To obtain an enlarged or zoom picture it is necessary to utilize greater data rates than present systems can handle. The present invention, by removing the computer from the data path, is capable of operating at these higher data rates.

Exemplary of prior systems for displaying data on large display devices are U.S. Pat. Nos. 4,009,335, 3,941,926, and 3,961,365 assigned to the assignee of the present invention.

PRIOR ART STATEMENT

In accordance with the provisions of 37 CFR 1.97 et seq., applicants state that the above referenced patents represent the closest prior art of which they are aware. These patents disclose large video display devices in which video data is digitized and a complete frame is stored in the memory of a digital computer. The data is then taken from the computer memory and transferred to the display board for illuminating the display devices.

In the first mentioned patent a four shades of gray device is disclosed in which data is transmitted from the computer to the board during a time window between processing cycles. In the second mentioned patent a device capable of displaying eight or sixteen shades of gray is disclosed and a suggestion of employing a random access memory (RAM) is included. See particularly columns 17 and 18 of U.S. Pat. No. 3,941,926 which contemplate a system eliminating the computer and substituting a RAM memory to store the digitized video data. The increase in data handling rates with this modification is also recognized. In the last mentioned patent a color display system is disclosed similar to the eight shades patent which, however, employs parallel data handling systems to generate information for bulbs of different colors which are clustered to generate a color display.

SUMMARY OF THE INVENTION

The present invention employs an entirely different system architecture whereby video data is received through a video interface from a video to digital converter. The information is stored directly in a high speed random access memory display buffer and then outputted via display interface to the display board. The computer is not present in the data path but does control the system operation through a system interface. A computer interface is also provided whereby video information stored in the computer memory or on computer soft ware devices, such as disk storage, may be inputted to the display buffer for transmission to the board.

The video converter includes means for digitizing the video signal and for altering both the size and resolution of the video display thereby to permit an enlarged display without an appreciable reduction in picture quality. This is accomplished by utilizing additional lines of video data in the field from which the picture information is being obtained whenever an enlarged picture is desired. Thus, for example, in the standard display mode every other raster line in one field of a two field video frame is employed. In the zoom mode of the present invention every line of one field is utilized. The horizontal clock rate is increased during the zoom mode to maintain the correct aspect ratio.

It is accordingly an object of the present invention to provide an improved video display system of the type employed in statia which is capable of high speed operation.

It is another object of the present invention to provide a video display device which is computer controlled but does not utilize the computer as the primary storage area for the digitized video information.

A further object of the invention is to provide a versatile video display system which can display video information, statistics and similar data.

Another object of the invention is to provide a scoreboard display device capable of enlarging a portion of a video picture which is of particular interest and which is capable of altering the display size for special applications as, for example, at a racetrack, while maintaining picture resolution at an acceptable level.

Other objects and advantages of the invention will be apparent from the remaining portion of the specification.

DETAILED DESCRIPTION

General System Arrangement

Figure 1A:
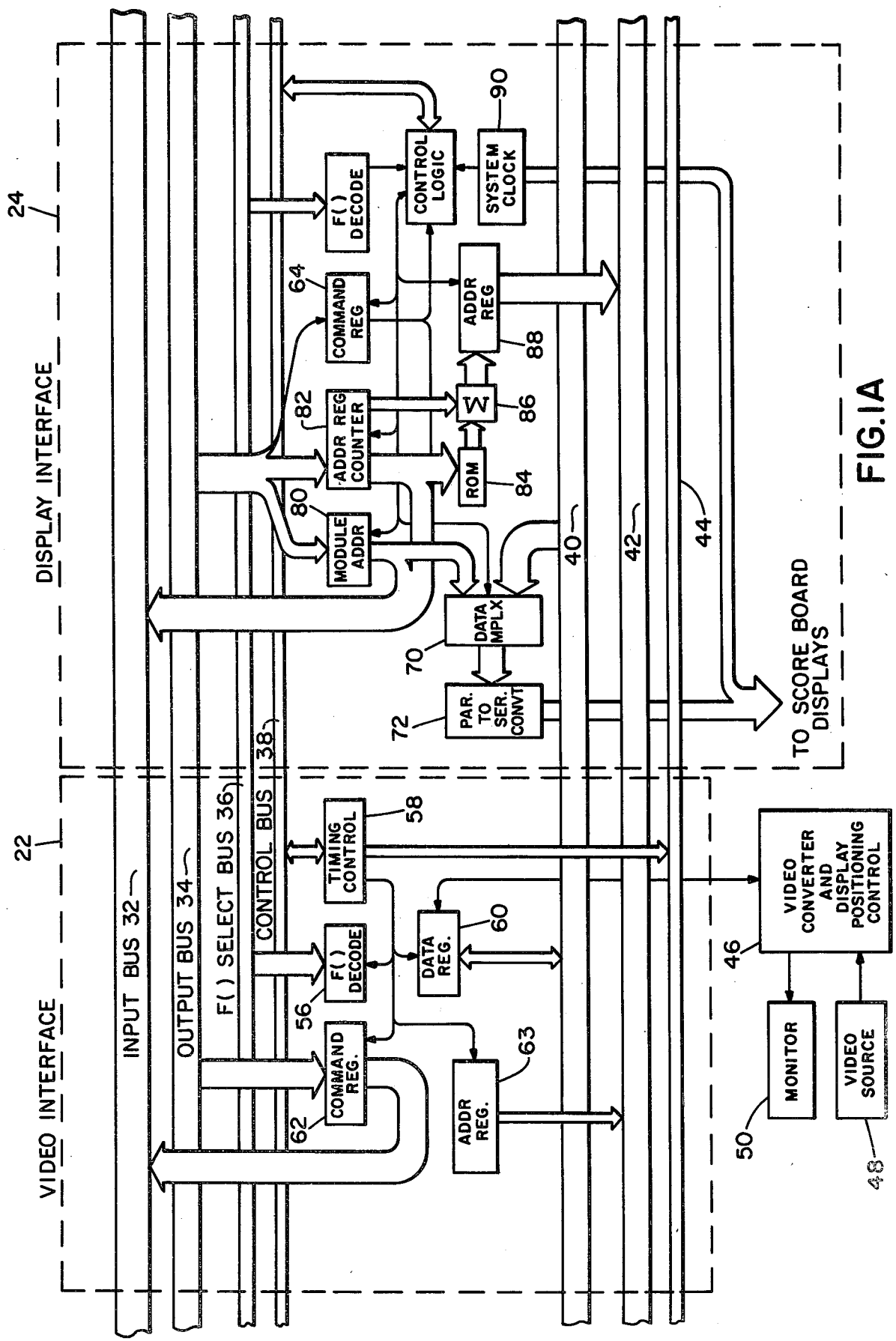
FIGS. 1A and B comprise a schematic block diagram of the display system according to the present invention.
Figure 1B:
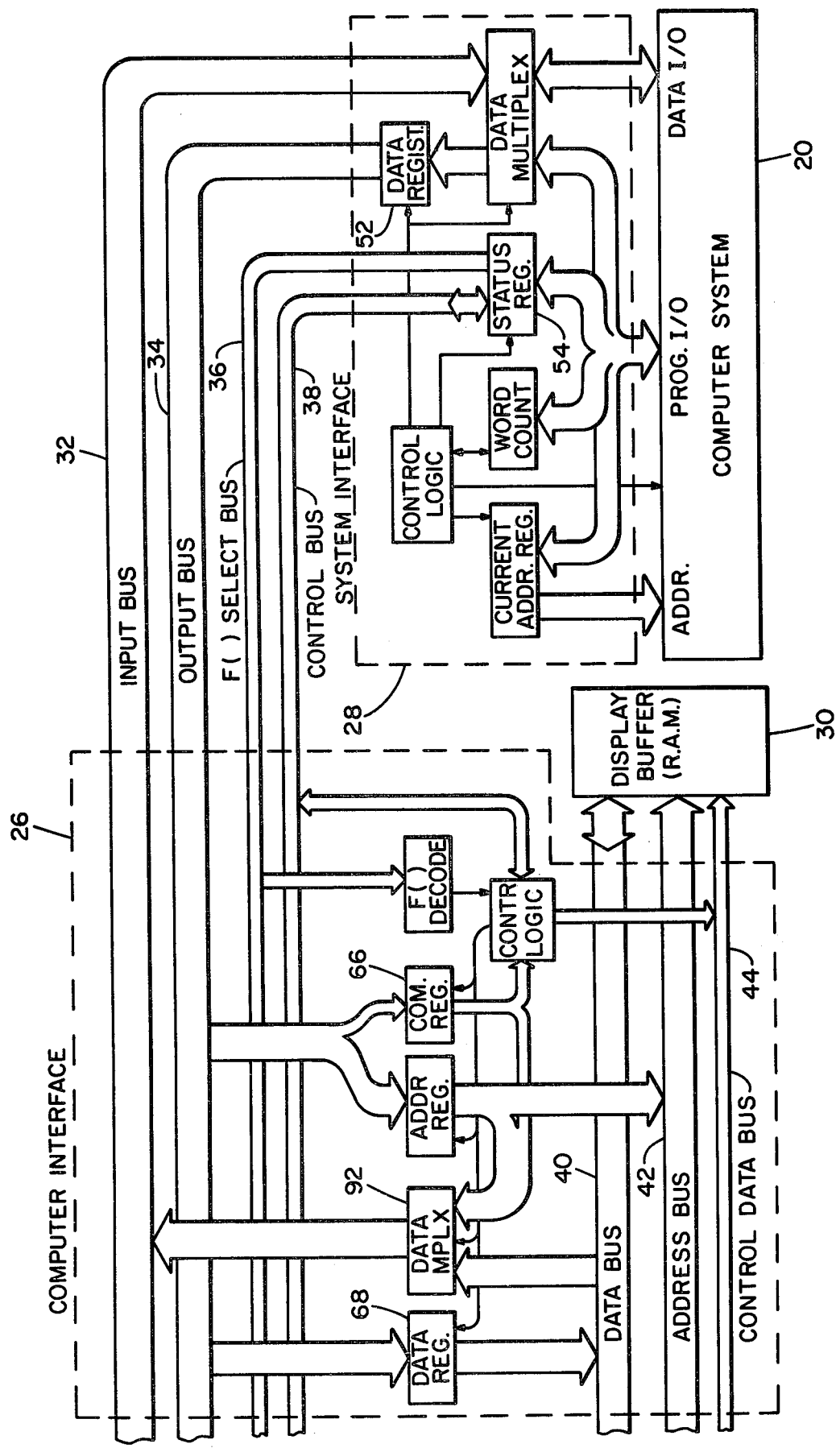

Referring now to FIGS. 1A and 1B, the general arrangement of the invention is illustrated. The system architecture utilizes a common bus technique for transmitting data between the various interfaces and a computer system 20 which controls system operation. The system is provided with a video interface 22, a display interface 24, a computer interface 26, and a system interface 28. Interfaces 22, 24, and 26 serve to move data, under computer control, into and out of a display buffer 30. Display buffer 30 is high-speed random-access memory of sufficient size to store video data for a complete frame which is to be displayed in a scoreboard of the type suitable for use in large stadia. As is well known in the television art, a complete frame of video information is usually formed of two interlaced fields of information displayed by scanning horizontally in a raster fashion. For the purposes of this application, however, it will be considered that a "frame" of video information is comprised of but one field rather than two. Accordingly, a frame of video information is comprised of n horizontal lines forming one field. Such a frame can be obtained from a video source merely discarding the second field.

A statisfactory description of a typical stadium scoreboard is given in the aforementioned U.S. Pat. No. 3,941,926, particularly FIGS. 5, 6, 13, 14, 9, 10, 11A and the associated descriptive portions of the patent. That patent, including the aforementioned portions thereof, are hereby incorporated by reference.

The system interface 28 interfaces the computer system 20 to the various buses, including the input bus 32, the output bus 34, the function select bus 36, and the control bus 38. It will be observed that each of the interfaces 22, 24, and 26 is connected to these buses so that the computer system 20 can operate the desired interface by sending appropriate signals on the various bus lines through the system interface 28. It should also be noted that this bus arrangement permits additional display interfaces to be added to the system merely by tying them to the bus structure. Thus, for example, additional display interfaces could be added for multiple scoreboards, or other custom-designed devices could be added to the system by the use of an appropriate interface design of the type detailed in this specification.

The transmission of data between the various interfaces and the display buffer 30 is similarly accomplished by the use of a bus structure, including data bus 40, address bus 42, and control data bus 44. It will be observed that the buffer 30 is connected to each of the display interfaces via this bus structure.

The video interface 22 receives digitized video information from a video converter and display control 46 which, in turn, is connected to a video source 48. The video source may be the line feed from a network broadcast, a video tape recorder or other source. Converter and display control 46 output also drives a monitor 50 so that the control room may preview what is to be displayed.

The video interface 22 connects the video converter 46 to the display buffer 30 via the buses 40, 42, and 44. The display interface 24 connects the display buffer 30 to the scoreboard display which includes a matrix of variable intensity display devices, such as light bulbs. The data is utilized to illuminate these devices in order to reproduce the video information for the benefit of spectators at a sporting event, concert, or the like.

The computer interface 26 provides a similar data connection between the computer and the display buffer 30. This interface is utilized for providing pictorial or text input from the computer ststey as, for example, from a disk storage device to the display buffer 30. An example of this type of usage would be the display of statistics on individual players during a baseball game, which statistics are stored in the computer memory and updated as the game progresses. Other examples of the use of the computer interface include displaying portraits of a player or single or multiple frame cartoons which have been stored in the computer system memory.

As indicated in the background portion of this specification, a principal object of the invention is to remove the computer system from the direct data path so as to obtain higher rates of data handling. It will be observed that the interfaces 22 and 24, although under computer control, directly receive and transmit data to and from the display buffer without utilizing the computer's memory capabilities or its data break facility. Computer interface 26 does employ the computer's memory facility but only for the special purposes indicated where higher data handling rates are not necessary.

Computer System and System Interface

The computer system 20 may be any desired computer system capable of operating under the conditions specified herein. Preferably it will be a mini computer utilizing a common busing structure and having a data break facility. Mini computers well suited for this purpose are manufactured by the Digital Equipment Corporation. of Maynard, Mass.; and, in particular, their series PDP8 and 11 are suitable for use in the present invention.

The system interface 28 may be custom designed for a given installation or available hardware can be utilized. For example, the system interface 28 could be the Digital Equipment Corporation Model DR11B which is capable of interfacing the buses 32, 34, 36, and 38 to the computer. The necessary functions for the system interface are indicated in block form and will be described for completeness. Upon command by an operator, the computer system, via the system interface, will cause one of the selected interfaces 22, 24, or 26 to be enabled to transfer data into or out of the display bufer 30. A command is provided to the data register 52 while the device selected is identified by a device code in the status register 54. The code set in the status register selects one of three interfaces 22, 24 or 26. For the purpose of discussion, it will be assumed that the video interface 22 has been specified in status register 54. Thus, the device code placed in the status register will match the code assigned to function decode register 56 of the video interface 22. When a "Go" is sent by the system interface on the control bus 38, the timing control 58 of the video interface initiates operation. If the function selected is a transfer of data from the video converter 46 to the buffer 30, such a transfer is initiated. The data register 60 receives the digitized data from the video converter 46 and outputs it via the data bus 40 to the display buffer 30. The address register 63 via the address bus 42 indicates the correct address for storing the data in the buffer.

Upon transferring data for a complete video frame, a signal is sent via control bus 38 to advise the system interface 28 that the data transfer is complete. Computer 20 will then change the code in the status register 54 to select a new device and change the command by changing the code in data register 52. If, for example, it is desired to transmit the data stored in the ram 30 to the display boards, the function code for the display interface 24 would again be loaded into status register 54, while the data register would contain the proper code for transmitting data to the board.

Alternatively, the system is capable of transferring data to and from the computer system for specialized purposes. This transfer, as with every other transfer of data in the present invention, is to and from the ram 30. For example, video from source 48 can be received through the video interface and stored in the buffer 30; and then, through the computer interface 26, sent to the computer system for storage on disk or other storage devices. After appropriate processing or when desired, the computer-stored information can be fed back through the computer interface 26 to the RAM and then transferred to the board or to the video monitor 50 for editing or previewing.

The operation of the video interface will be discussed in greater detail in connection with FIG. 2. The display interface and computer interface are substantially identical with regard to the hardware and the function performed. They do differ, one from the other, in some respects in order to accommodate the particular function to which they are dedicated. The video interface 22 is provided with a command register 62 which selects the particular operation which the interface performs. Similarly, the display interface and the computer interface have command registers 64 and 66, respectively. All three interfaces similarly include a function decoder to recognize when a given interface is selected. The video interface includes data register 60 capable of transferring data to and from the video converter 46 and to and from the data bus 40. The computer interface includes a similar data register 68.

The display interface is provided with a data multiplexing register 70 for receiving data from data bus 40 and transmitting it via the parallel-to-serial converter 72 to the display boards. When it is desired to transmit this information from the display buffer to the scoreboard the display interface 24 is selected by the computer system. The display interface is provided with addressing circuits including a module address register 80, an address register counter 82, a read only memory (ROM) look up table, an adder 86 and an address register 88. These elements function to alter the sequence of data transmission from the display buffer to the displays. In general, video data is uusally transmitted in a raster format comprised of a large number of horizontal lines of data. The present system stores the data in the buffer 30 in that format.

It is desirable in large displays of the present type to transmit the data in a different format, namely, in modules so many elements high by so many elements wide whereby the power requirements for the display board can be evenly distributed. Thus, for example, a display board which is 60 lamps high by 144 lamps wide, a typical module might be on the order of 20 lamps high by 72 lamps wide and each module might, in turn, be further divided into sub-modules of 10 by 12 lamps for utilizing a three phase power supply. See the aforementioned U.S. Pat. No. 3,941,926, particularly FIGS. 5 and 6 and the associated description for a further discussion of this aspect of the invention.

The addressing elements in the display interface perform the necessary address mapping to convert data which has been stored in a raster fashion to a module format for transmission to the scoreboard. Stored in the ROM 84 is the correct addressing sequence for extracting data from the display buffer in modules. The module address register 80 keeps track of which module is being addressed and its output is transmitted to the data multiplexer 70 before each block of data is sent to the scoreboard. The address register 82 and the ROM 84 cause the correct address to be loaded into the address register 88 for obtaining the correct block of data from the RAM 30 for transmission on data bus 40 to the data multiplexer 70. Thus, the module address register 80 informs the board where each block of data sent from the multiplexer is to be displayed while the address register counter and ROM instruct the address register 88 where to obtain the next module of data whitin the display buffer 30.

The display interface is provided with a clock 90, which is used throughout the scoreboard display system. It is noted, however, that the computer system 20 operates independently of the display clock 90.

The computer interface 26 is provided with a data multiplexing capability in the form of register 92 for transmitting information from the data bus 40 to the computer input bus 32 when it is desired to store information in the computer system. With the foregoing exception, the interfaces 22, 24 and 26 are essentially the same in that they interface with the computer system through the system interface 28 and transmit to and receive data from the display buffer 30. The video interface is described in greater detail in connection with FIG. 2 and much of the description there applies to the display and the computer interfaces.

Summarizing the structure thus far described, it will be apparent that a busing structure is disclosed to which are connected: the video, display, and computer interfaces. By means of this structure, it is possible to transfer video data to or from any of the interfaces, using the display buffer 30 as the intermediary. Thus, for example, it is possible to transfer data from the computer system 20 to the video inerface or to the display interface. This would be accomplished by outputting the data from the computer system to the output bus 34, through the computer interface 26, and into the display buffer 30. The data would then be transferred from the display buffer to either the display interface for transmissiom to the scoreboard or the video interface for transmission to a monitor 50 via the data bus 40. The reverse data transfer is also possible wherein the video interface provides data from the video converter 46 to the data bus 40 and the display buffer 30. That data can then be provided to the display interface 24 for transmission to the display board or, via the computer interface 26 provided to the input bus 32 for receipt and storage by the computer system 20. The versatility of the system according to the invention is thus apparent and the extreme flexibility obtained is a significant advantage of the invention over the prior art.

Video Interface

Figure 2:
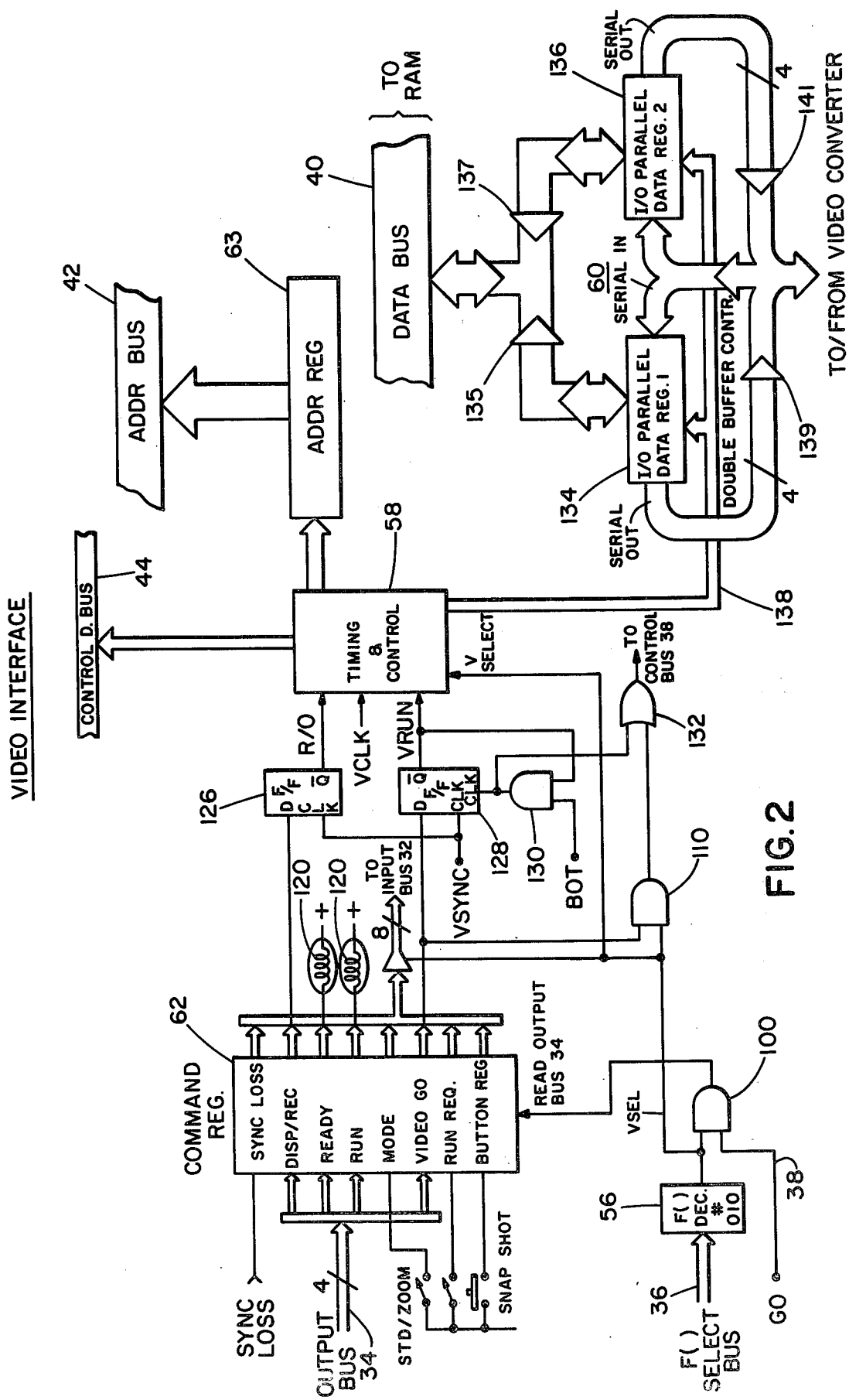
FIG. 2 is a schematic diagram of the video interface according to the present invention.

Referring now to FIG. 2, the video interface is illustrated in block diagram form. The various buses by which the interface communicates with the system are indicated. The function select bus 36 is connected to the decoding register 56 so that when the transmitted code matches the code in the register an output, VSEL, is produced which is applied to AND gates 100 and 110. Subsequently, when the go signal is received from the control bus 38 gate 100 is enabled thereby providing a signal to the command register 62 to read the contents of the output bus 34 to determine what operation is desired. The output bus comprises four lines which are applied to the indicated inputs of the command register. Depending upon the code transmitted on the output bus, the command register is instructed to operate in one of several modes. Inputs are also provided for various display options which will be described subsequently.

The sync loss input to the command register 62 is an indication that some time during the receipt of video data synchronization was lost and that the picture information is faulty. Upon receipt of this signal the command register notifies the computer system via the input bus 32. The DIS/REC input to the command register determines whether the command register operates in the record or display mode. The display mode transmits digitized video information from the display buffer 30 to the video converter 46 for display on monitor 50. The display mode is utilized for previewing or for testing the system. The record mode transfers data from the video converter to the display buffer 30.

The ready and run inputs to the command register, drive panel lights 120 and 122 to provide the operator with information as to the status of the system. The ready light indicates that the system is waiting for instructions from the operator to begin processing while the run light indicates that viewo is being processed by the system. The mode input, depending upon the state of the switch 124, instructs the command register to blank an unused portion of the display board so that ransom data is not displayed adjacent a meaningful display.

It will be recalled that the go signal initiates operation of the command register to read the data on the output bus 34. As a result latches 126 and 128 are toggled depending upon the mode selected. In the case of flipflop 126 the output is high when the record mode is selected. Flipflop 128 produces an output, VRUN, when the go signal is received in the command register. Both flipflops are clocked by the vertical sync signal and their outputs are provided to the timing and control circuit 58 discussed in connection with FIG. 3. Also provided to the timing and control circuit is the VCLK signal generated by the video converter of FIGS. 9A and B.

Depending upon which mode (Record or Display) the command register is operating in, AND gate 110 or 130 will generate a signal via OR gate 132 producing an output on the control bus 38 to the computer after a complete frame of video data has been transferred. The inputs to AND gate 130 are the VRUN signal and the bottom signal generated by the video converter indicating the last line of the frame.

The timing and control circuit 58, described in greater detail in connection with FIG. 3, operates the double buffered data register 60 for inputting or outputting data to or from the data bus 40 and for correctly addressing this data via address register 63 and the address bus 42. Data register 60 is a double buffered register arrangement employing registers 134 and 136. Each register is capable of serial and parallel transfer of data. The double buffer control bus 138 operates the buffers in a known manner wherein one of the registers loads data while the other transmits or receives data. This provides an extremely fast data transfer mechanism and, in particular, since the transfer to the data bus 40 is parallel the display buffer 30 may be quickly loaded with the video data for a full frame. Tri-state gates 135, 137, 139 and 141 control the data flow to and from the registers 134 and 136. Thus, during serial transfer of data from the converter to the display buffer, gates 139 and 141 present a high impedance to permit serial loading of registers 134 and 136.

Timing and Control Circuit

Figure 3:
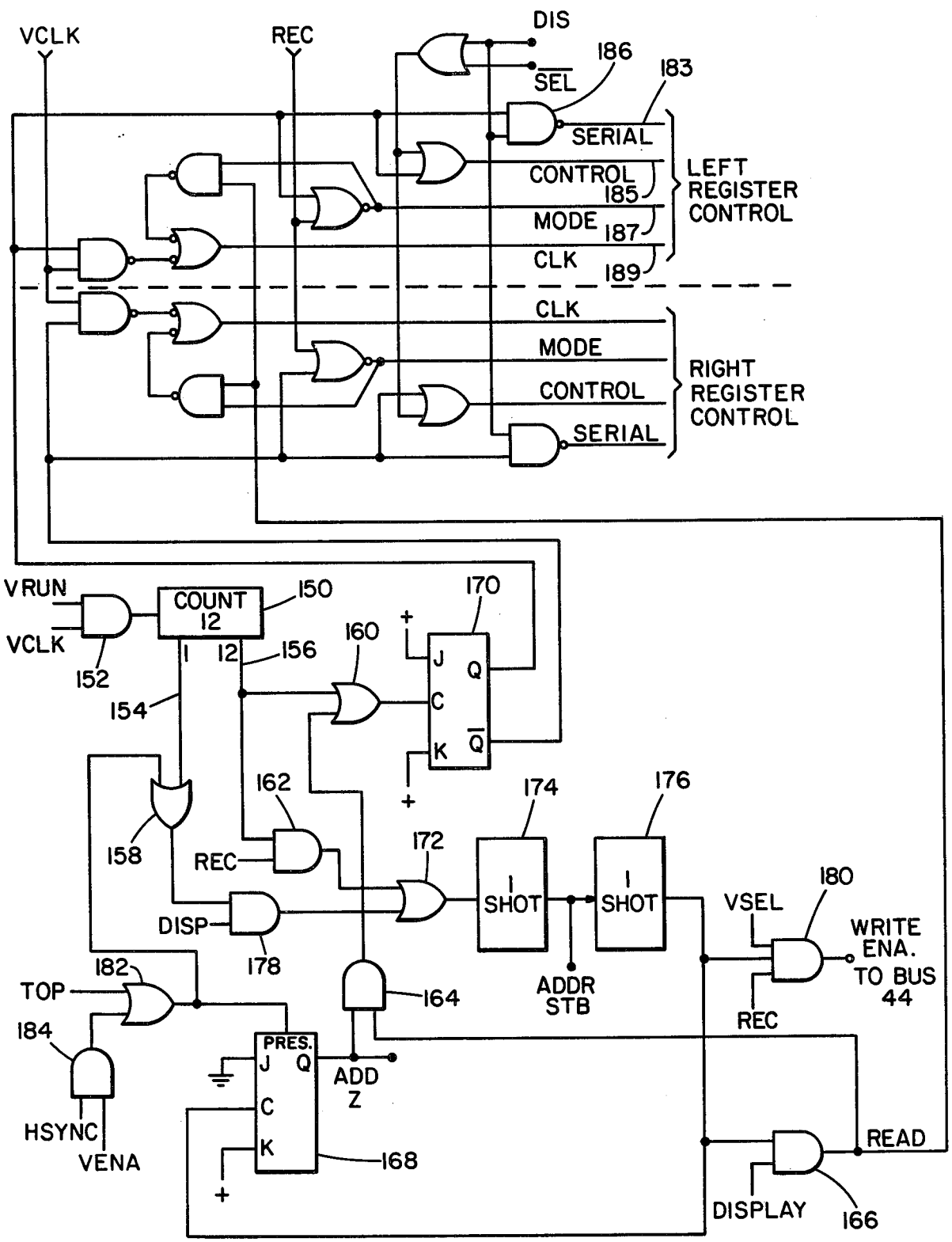
FIG. 3 is a schematic diagram of the timing and control circuits incorporated in the video interface.

Referring now to FIG. 3, a schematic of the timing and control circuit is illustrated. This circuit, depending upon whether the video interface is in the record or display mode, causes the proper loading and transmission of data through the buffers 60. A counter 150 is clocked from an AND gate 152 which has as its input the VRUN signal and the VCLK signal. VRUN is a signal generated from the video interface which starts the video data moving to or from the video interface. The VLCK signal is generated by the video converter circuit and is described in connection therewith. Counter 150 counts to 12 and produces outputs on lines 154 and 156. A "count one" signal is produced on line 154 and applied to OR gate 158. The output on line 156 is the "count 12" pulse and is applied to OR gate 160 and AND gate 162. The other input to gate 160 is from AND gate 164 which, in turn, has as its inputs the Read signal produced by gate 166 and the Add Z signal from the Q output of flipflop 168. OR gate 160 drives flipflop 170 which controls the double buffered operation of the register 60 so as to alternate loading and transmission of data to and from the registers 134 and 136 (FIG. 2).

Gate 162 also receives Rec signal and its output is provided to OR gate 172 which, in turn, is provided to a pair of one shots 174 and 176 connected in series. The other input to gate 172 is from gate 178 whose inputs are the display signal and the output of gate 158. The output of the one shot 176 is provided as an input to AND gates 180 and 166 and as the clock input to the flipflop 168.

For a purpose to be described, the flipflop 168 has its present input connected to the output of an OR gate 182, the inputs of which are the top signa and the output of gate 184, the inputs to the latter being the horizontal sync and the vertical enable signals. The operation of the circuit as thus far described is relatively straightforward. The counter 150 drives the flipflop 170 to alternate loading and transmission of data to and from the data registers 134 and 136. Thus, when the Q output is high, the left register will load data while the right register will transmit or receive data. The count one and count twelve outputs from the counter 150 also control generation of the read and write logic gates 180 and 166. It will be recalled that in the Display mode data is loaded in parallel from the display buffer and transmitted in serial fashion to the monitor for previewing, etc. In the Record mode data is received from the video source in series and provided to the display buffer in parallel. Thus, in the Display mode gates 178 and 166 are enabled by the Display signal producing the read signal from gate 166 and operating the flipflop 168. Conversely, in the Record mode gates 162 and 180 are enabled producing the write enable signal applied to the control data bus 44.

When operating in the display mode, an important feature of the timing and control circuit is the recognition of the start of a line and particularly the first line in a frame. It is necessary at the beginning of each line to preload one of the registers so that data is present therein for the first cycle of transmission. This is accomplished by flipflop 168 and the gates associated therewith. At the beginning of every frame the top signal goes high presetting flipflop 168 via the gate 182. This enables the Q output designated Add Z which is anded when the Read signal from gate 166 to toggle the flipflop 170. Thus, at the beginning of every frame the first data work to be transmitted is preloaded into the buffers prior to the first clock cyle. After the preload, flipflop 168 is reset by the output from one shot delay 176 applied to the clock input. After the first line the add Z signal is produced under control of gate 184 in response to the horizontal sync and vertical enable signals which are the inputs to that gate. Thus, flipflop 170 changes state when any one of the following three conditions occur: (1) just after the first read cycle following a "top" signal when in the display mode; (2) just after the read cycle produced following the "HSYNC" on every line except the top line of a frame, when in the display mode; (3) on every count 12, which counter 150 produces, in both the display or record mode.

Referring now to the top portion of FIG. 3, the gating for the registers 134 and 136 is illustrated. The dashed line separates the gating for each of the data registers. The gating for each register is identical. The gating for the left data register 134 generates four outputs on lines 183, 185, 187 and 189. The output on line 183 is the serial control operating the control line for the tri-state gates 139 (FIG. 2) which selectively connect or disconnect the serial output from data register 134 to the video converter 46. This output is produced by NAND gate 186 which receives as its input the output from flipflop 170 and the Display signal. Thus, when the left register 134 is selected and the Display mode is chosen, an output is produced to permit serial data transfers to the video converter 46.

Line 185 is the control line which either enables or disenables the parallel outputs of the data register associated with it. It controls the operation of the tri-state gates internal to the gates internal to the data register 134.

Line 187 is the mode select line enabling the register to either be loaded in parallel or shift data in or out in serial. Line 189 is the clock signal. In the display mode the clock signal provides the read pulse from gate 166 to parallel load one of the registers and the VCLK signals to serially shift the data out. In the record mode the clock line 189 applies VCLK signals only (since the write pulse from gate 180 is applied to the display buffer 30).

Summarizing the operation of the FIG. 3 circuit, in response to certain inputs, including the VCLK, VRUN, HSYNC and VENA signals, the circuit causes the two data registers 134 and 136 to alternate between loading and transmission of data to or from the display buffer. The loading and transmission is in a double buffer format to maintain maximum data handling rates. Provision is made for preloading one of the data registers prior to the beginning of each line.

Display format: Standard Zoom and Wide Screen

Figure 4:
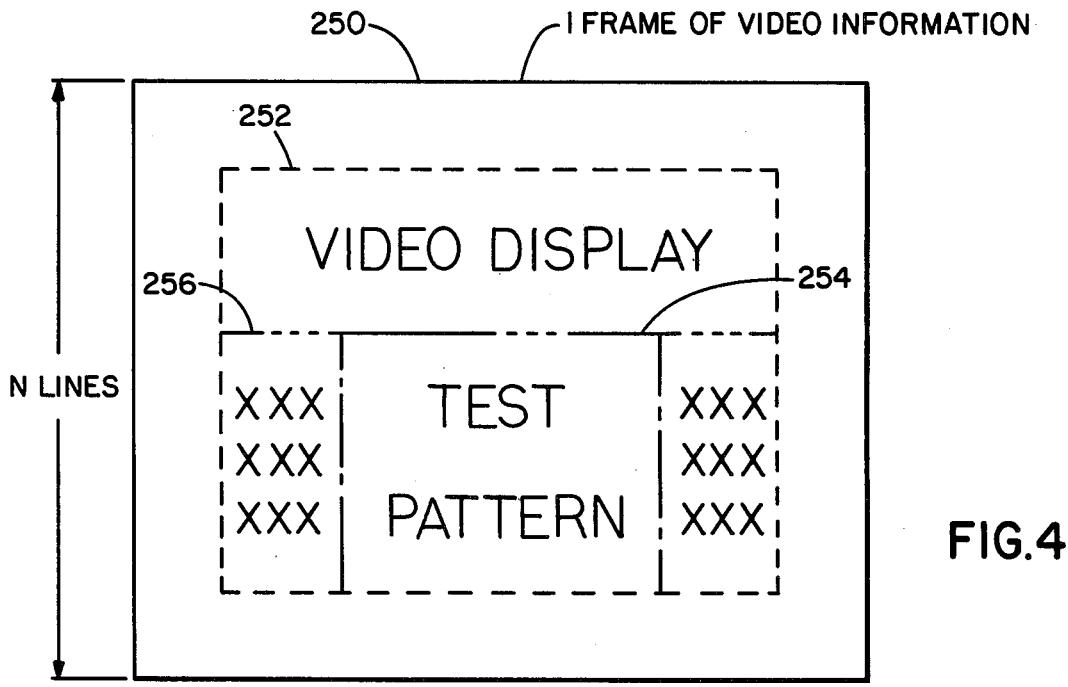
FIG. 4 is an illustration of a frame of video information used to indicate the various operating modes of the invention.

Referring now to FIG. 4, there is illustrated a representation of a frame of video information. As is well known in the television art, a complete frame of video information is formed of two interlaced fields of information displayed by scanning horizontally in a raster fashion. For the present purposes it will be considered that a frame of video information is comprised of but one field rather than two. Accordingly, a frame of video information 250 is comprised of n horizontal lines comprising one field. Such a frame can be obtained from any video source merely by discarding the second field.

Figure 5:
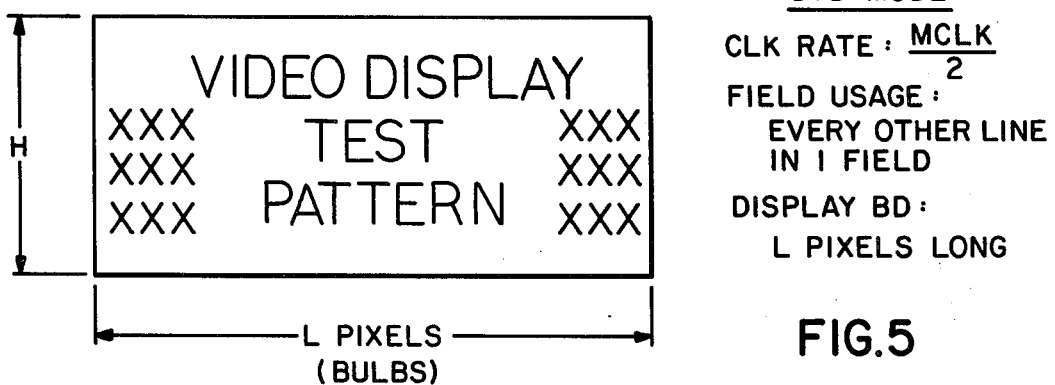
FIGS. 5, 6 and 7 illustrate the resulting display of the FIG. 4 video frame in the standard, zoom and wide screen operating modes.

Frame 250 illustrates a video display test pattern over a substantial portion of the frame. The dashed line 252 illusrates that portion of the video frame which is utilized during a standard operating mode of the display system. In the standard operating mode substantially all of the frame is utilized with the omission of only the edges of the frame. Thus, as illustrated in FIG. 5, when operating in the standard mode the entire test pattern is illustrated with the correct aspect ratio of height to width. In the standard operating mode, as will be described in connection with the video converter and display control circuitry, the horizontal sampling rate is one-half that of the master clock, MCLK, while the vertical circuitry utilizes every other horizontal line of data in the frame.

A second mode of operation, conveniently referred to as the zoom mode, displays a portion of the video frame indicated by the dotted box 254. In the zoom mode a selected portion of the video frame is displayed over the entire display board. In this manner an "enlargement" of the selected portion is achieved while maintaining the proper aspect ratio. This enlargement is achieved by utilizing every line of the field rather than every other line while at the same time doubling the horizontal sampling rate to equal MCLK. This prevents loss of resolution. The zoom display finds use for displaying close plays in a sporting event or other fine detail as may be desired. The result of utilizing the zoom mode is illustrated in FIG. 6.

A third display mode is possible with the present invention and will be hereafter referred to as the wide screen mode. In this mode, in a manner similar to the zoom mode, every line of the field is utilized. Again, as with the zoom mode, the horizontal sampling rate is double that of the standard mode. The horizontal length displayed by the wide screen mode, however, is the same as the standard mode as indicated by the dashed box 256. The wide screen mode finds particular application to certain types of sporting events as, for example, at racetracks where it is desired to show the entire field of horses in a given race. Under these circumstances, to utilize all the video data available an elongated display board is employed. The use of every line in the field maintains the proper aspect ratio between vertical and horizontal components of the image when the fast clock rate is employed.

For practical reasons it is not desirable nor economically feasible to increase the height of the display board in proportion to the increased width. In the wide screen format this problem is resolved by nevertheless utilizing every line in the field but discarding top and bottom portions of the picture thereby displaying only the central portion of the frame. In situations such as horse racing this is acceptable since the discarded portions of the picture are unnecessary. The wide screen mode is illustrated in FIG. 7.

Figure 6:
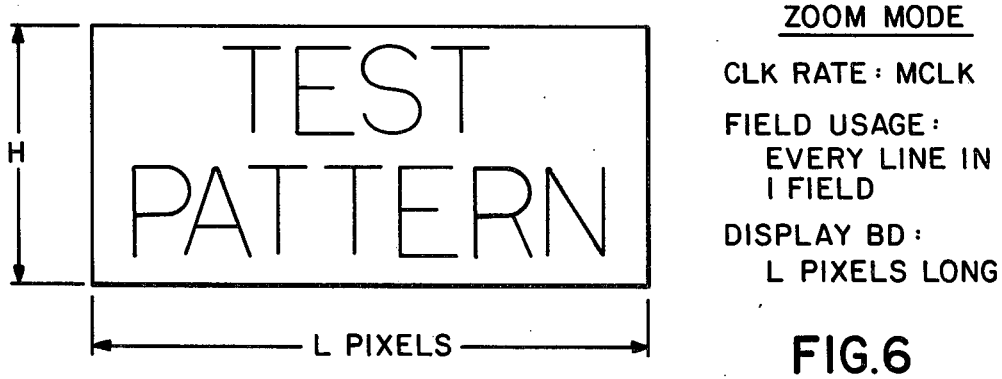
Figure 7:
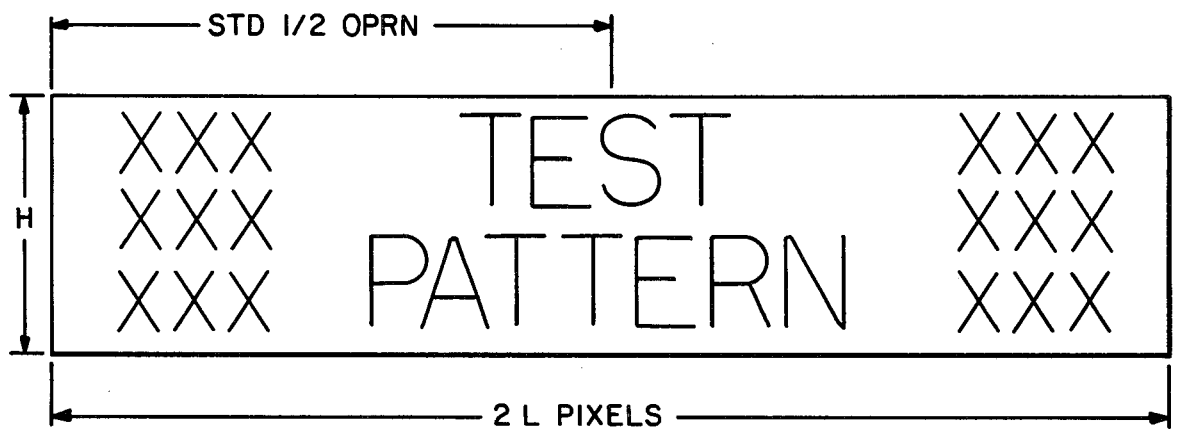

Referring to FIGS. 5-7, the video displays obtained in each of the three display modes are illustrated. FIG. 5 shows that in the standard mode substantially the entire video frme is displayed on a display board which is L pixels wide. The term pixels refer to the number of picture elements or dots in a horizontal line of video data. The standard mode display is obtained using a clock rate equal to one-half the M clock frequency. This mode employs every other line in one field and utilizes a relatively long H enable signal by virtue of the values preset into the switch matrix described in connection with FIG. 9B. FIG. 6 illustrates a display board in the zoom mode. Here only a portion of the video frame is displayed but on an enlarged scale. It should be noted that the display board is of the same dimension as the board of FIG. 5, that is, it is L pixels wide. The clock rate during the zoom mode is double that of the standard mode and equals M clock. The field usage is every line in one field while the H enable signal is set by the switch matrix of FIG. 9B to be approximately one-half the duration of the H enable signal for the standard mode. This is unnecessary since the sampling rate has doubled while the number of pixels remains the same.

Referring to FIG. 7, the wide screen embodiment employs a display board having a significantly greater number of pixels than the standard mode display board. This board is shown in FIG. 7 as having 2L pixels but it will be appreciated that any number of pixels can be provided depending upon the board configuration desired. 2L pixels are illustrated for explaining the operation of the wide screen mode. In the wide screen mode an enlarged display, as compared to the standard mode, is at the same clock rate as the zoom mode. However, because of the additional pixels, it is possible to utilize the entire horizontal line of video information from the video frame. The clock rate employed is the master clock frequency while every line in the field is utilized. The H enable signal is the same as utilized for the standard display, that is, relatively long as compared to the H enable signal provided for the zoom mode.

Figure 9B:
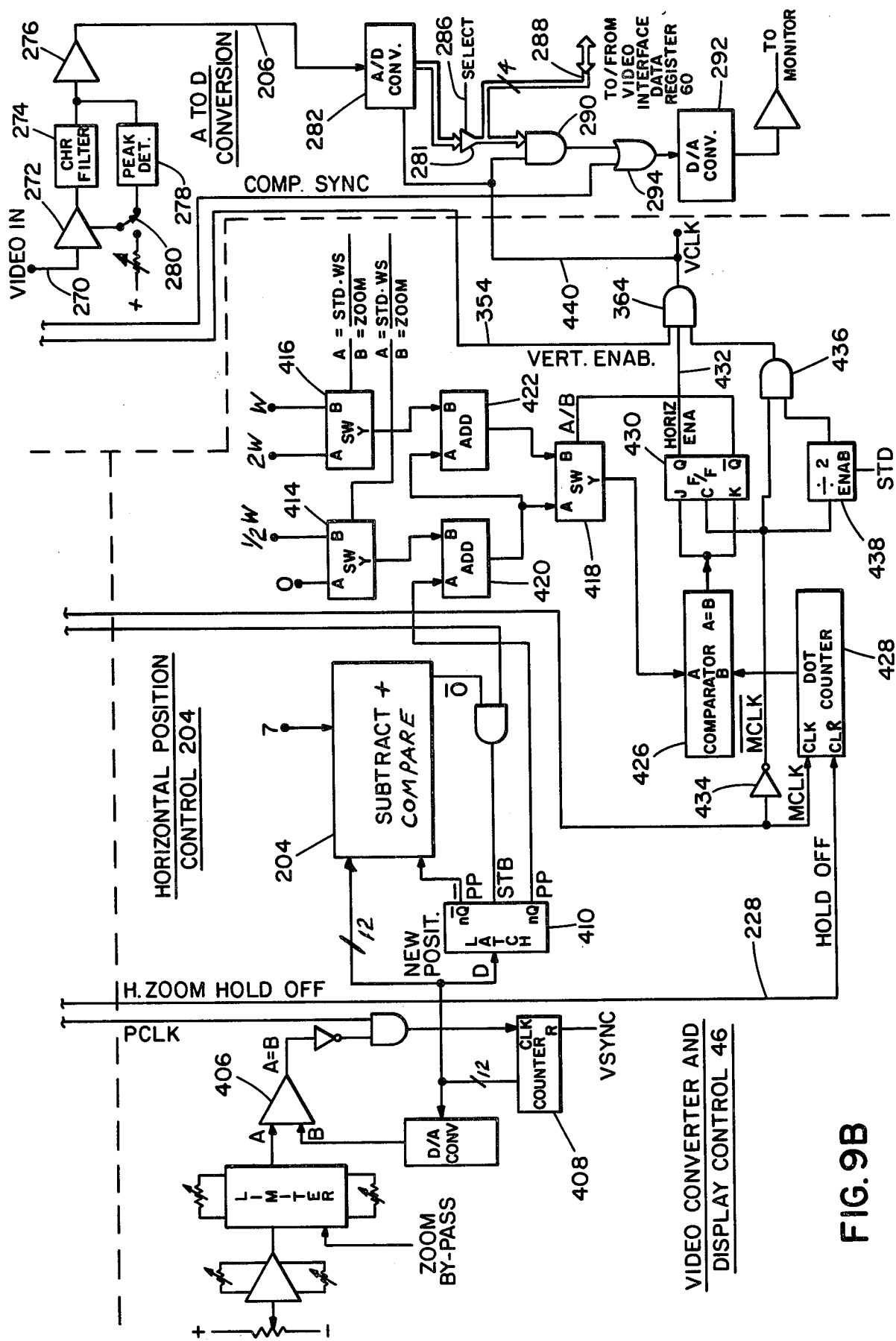
FIGS. 9A and B is a schematic of the video coverter and the display control according to the invention.

It should be recognized that where an elongated board is provided it is possible to switch between the wide screen mode and the standard mode by changing values to the switch matrix of FIG. 9B. In that case a standard display could be provided on a portion of the display board less than 2L pixels wide. For example, one-half of the board could be utilized to display video information between races at a racetrack. In that case the unused portion of the display board would be blanked by the computer, since the software monitors the mode bit of the video interface command register 62. Such a sub-mode of operation can be referred to as the standard one-half mode in which an elongated display board has only a portion of its display area utilized to display video information.

Figure 8:
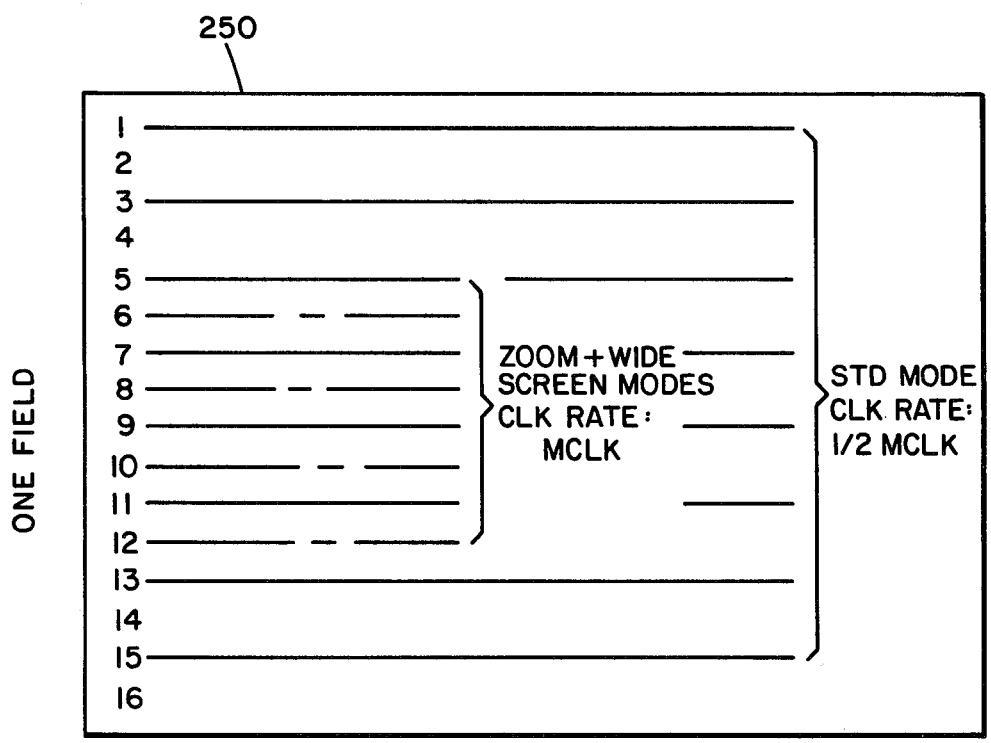
FIG. 8 is a diagram illustrating the manner in which the video data is utilized in each display mode.

Referring to FIG. 8, the changes between mode one and modes two and three with respect to the lines of the field utilized are illustrated. For explanatory purposes there is illustrated a video frame employing a field of 16 horizontal lines. In mode one, the standard mode, every other line is utilized to produce the display. In modes two and three every line over a selected portion of the frame is utilized and in the drawing these are lines 5 through 12, inclusive. In mode one the horizontal sampling rate is ½MCLK while in modes two and three the horizontal sampling rate is MCLK. The difference between mode two and mode three is the duration of the horizontal enable signal (see FIG. 10) and the number of pixels.

Video Converter and Display Control

Referring now to FIGS. 9A and B, a schematic diagram of the video converter and display control 46 is illustrated. For ease of discussion, this circuit can be separated into four functional segments, namely, the sync and timing circuits 200, the vertical position control circuitry 202, the horizontal position control circuitry 204 and the analog to digital conversion circuitry 206. In large part the vertical position control and horizontal position control circuits are identical. For that reason the horizontal position control circuit will be discussed only with respect to the circuit elements which differ from the vertical position control.

Sync and Timing

The sync and timing circuit receives a composite video sync signal from the video source 48 at terminal 208, which is the input to a chroma filter 210. The output of the chroma filter is applied to the sync separator 212 which generates a composite sync signal on line 214, a vertical sync signal on line 216 and a horizontal sync signal on line 218. The sync separator also generates a signal on line 220 indicative of a loss of synchronization during the separation process. This sync loss signal is provided to the command register 62 of the video interface when synchronization is lost to notify the computer system that a frame of bad data has been received and should be disregarded.

The horizontal sync signal is provided to a phase locked loop circuit (PLL) 222 to generate the various clock signals required by the system. The phase locked loop circuit produces the master clock signal (MCLK) on line 224 and a pointer or position clock (PCLK) on line 226. In addition, PLL 222 generates a hold off signal on line 228 via flipflop 230 utilized to reset the dot counter 428.

Analog to Digital Conversion

Referring to the right hand portion of FIG. 9B, the analog to digital conversion circuit is illustrated. The video signal is received at terminal 270 and applied to amplifier 272, chroma filter 274 and amplifier 276. An automatic gain control, AGC, is provided to maintain the signal at a desired level in a conventional manner. The AGC control employs a peak detector 278 and a switch arrangement 280 for defeating the AGC when desired. In that case unity gain is employed by the amplifier 272. The filtered and amplified signal is provided to an analog to digital converter 282 which may be of a conventional design, such as the devices manufactured by Datel or Computer Labs. Exemplary are models Nos. ADC-UH4B, Datel; MATV-0811, Computer Labs. The output of the analog to digital converter is provided on a four line bus which represents the video input quantized into four digital bits.

By use of four bits up to 16 levels of intensity can be distinguished and subsequently displayed on the scoreboard. The output of the A to D converter is provided to a tri-state buffer 284 which is controlled by a select line 286. When video data received at terminal 270 is being quantized and transmitted to the video interface for storage in the display buffer 30 the select line is enabled to permit data to pass from the analog to digital converter through the tri-state buffer 284 to the video interface via bi-directional bus 288. Alternatively, when data is received from the video interface the tri-state buffer 284 maintains a high impedance to permit the transmission of data from the bus 288 to a set of four AND gates represented by AND gate 290 which, when clocked by the V clock signal, provide the data to the digital to analog converter 292 for display on the monitor 50. Gate 294 permits the composite sync signal to be applied to the converter 292. This preview mode permits the scoreboard display operator to preview data stored in the display buffer prior to its transmission to the scoreboard for viewing by the spectators.

Vertical Position Control 202

Referring now to FIG. 9A, the vertical position control circuit is illustrated. The vertical position control circuit accomplishes two functions. First, it produces signals which determine the starting and stopping lines of the data transmission by the analog to digital converter 282 transferring data to the video interface and, secondly, it permits the variable positioning of the starting and stopping points so that a picture area of interest may be displayed while the remaining portions of the frame are discarded.

In the embodiment illustrated the vertical positioning is controlled by use of a joy stick 300 whereby movement of the joy stick causes a change in resistance applied as an input to amplifier 302. By examination of FIG. 9B, it will be seen that a similar joy stick is provided for the horizontal position control. If desired, these joy sticks may be mechanically linked together to provide a single control whereby the vertical and horizontal position of the information to be displayed can be selected.

Amplifier 302 includes variable resistances for adjusting gain and offset to determine the vertical range and vertical center of the display. Adjustments of these resistances adapt the system to different board sizes and configurations. The amplified signal is then provided to a limiter 304. In the standard mode limiter 304 clips the voltage by required levels. In the zoom or wide screen format clipping is not required and the limiter is bypassed by applying a signal to line 306. The output of the limiter is applied as one input to comparator 308, the output of which is provided via AND gate 310 to a counter 312. Counter 312 is a binary counter having 12 output lines represented by line 314. The current value of the counter is applied to a digital to analog converter 316. The value of the counter changes each time a PCLK pulse is applied to AND gate 310 if comparator 308 does not detect a match. The counter is reset each time a vertical sync signal is received.

The output of the digital to analog converter 316 is provied as a second input to the comparator 308. The counter 312 thus causes the converter 316 to generate an increasing voltage ramp which is applied as the second input to the comparator 308. That is, as the counter is incremented by PCLK pulses an increasing voltage is applied to the comparator 308. When the voltage from the comparator equals the voltage from the joy stick an output is produced by the comparator which, by virtue of inverter 320, disables AND gate 310. Counter 312, therefore, stops counting and maintains its output at the selected value corresponding to the joy stick setting. This binary value is applied to a series of 12 latches represented by latch 322 and to a 12 bit subtractor 324.

Briefly summarizing the circuitry just described, it will be seen that the counter 312 is reset at the beginning of each frame by the vertical sync signal and then begins counting. When the D to A converter ramp signal equals the value selected by the joy stick control the counter is disabled thereby producing a signal indicative of the desired vertical position of the display. This new vertical position information is provided to latches 322 and the 12 bit subtractor 324. The new position information is strobed into the latches only if it differs from the present position by more than a preset value. If not strobed into the latches it is discarded at the beginning of the next frame.

Upon receiving the position information, subtractor 324 determines the difference between the new position data and the present position data as represented by the 12 bits already stored in the latches 322. Upon completing the subtraction a comparator 326 determines whether the difference between the new position and the present position is greater than a fixed value. For purposes of illustrating this feature the fixed value selected is seven. Any other desirable value could be selected and provided to the comparator. Where the difference between the new position and the old position is less than seven it is assumed that the difference in position is due to the normal range of noise encountered in such a display system and is not due to a change in position of the joy stick control from its previous setting. In that case no output is produced from comparator 326 and the position data scored in latches 322 is retained. By not changing position when signals less than a selected magnitude are encountered system jitter is substantially reduced. In the event that the comparator detects a difference greater than seven between the new position data and the present position data, an output is produced on line 332 enabling AND gate 334 when the end of a frame has been detected by line counter 336. This strobes the 12 latches 322 loading the new position data.

The value stored in latches 322, whether changed or not, is applied as one input to an adder 330. Adder 330 in conjunction with adder 331 and switches 333, 335 and 338 form a switching matrix or network to permit the invention to operate in either the standard zoom or wide screen modes. Switches 333 and 335 include A and B inputs and outputs designated Y. By means of select lines 340 either input A or input B can be connected to the Y output. A similar statement is true of switch 338. The output from switch 333 is provided as the second input to adder 330 while the output from switch 335 is provided as one input to adder 331, the other output to this adder being the output from adder 330. The inputs to switch 338 are the outputs from the adders 330 and 331, as indicated.

The output of switch 338 is provided to a comparator 342 which compares the switch output against the value in the line counter 336. This value represents the current line and thus when the comparator 342 produces an output on line 344 it is indicative of a match between the value selected by the switch matrix and the line counter. This match is indicative of the vertical starting and stopping points of the display. The value provided to comparator 342 is selected according to the desired display mode.

In the standard mode the count in latches 322 is added to a number supplied to the switch 333. In the standard mode this number is zero since the display is to begin at the top of the frame. Accordingly, the output of adder 330, in the standard mode, will be precisely the number contained in the latches 322. In the standard mode switch 335 is provided at A input with a number corresponding to two times the number of lines in the frame (2H) since only every other line is used. This value is summed in adder 331 with the output of adder 330. This value represents the bottom line in the display and is then provided to the B input of switch 338. In the A position switch 338 provides the starting line of the display to the comparator 342 while in the B mode it provides the bottom line of the display.

The output of switch 338 is controlled by a flipflop 350 which is toggled by the output of the comparator 342 on line 344. The flipflop is clocked by the horizontal sync signal on line 218. The Q output of the flipflop is gated with a divide by two flipflop 352 to produce the vertical enable (VENA) signal on line 354. Flipflop 352 either toggles to divide by two if the standard mode is selected or is latched high if the zoom or wide screen mode is selected. In the standard mode a VENA signal is generated when the comparator 342 detects that the current line in the line counter is equal to the value from switch 338. Toggling flipflop 350 also alters the input to the comparator from switch 338 since the select line is connected to the $\overline{Q}$ output of the flipflop. Switch 338 then provides its B input which determines the bottom line of the display. This is accomplished in the same manner wherein the B value of switch 338 is compared against the current line in the line counter. When a match occurs the bottom of the picture has been located and the vertical enable signal is terminated when flipflop 350 toggles back to its set state in preparation for the next frame.

In the zoom or wide screen modes operation is much the same. However, the inputs to switches 333 and 335 are different. Instead of zero, H/2 (the number of horizontal lines in the frame divided by 2) is the input to switch 333. This value is determined by recognizing that in the zoom mode every raster line is utilized rather than every other raster line. Since it is desired to start the zoom mode one quarter of the way down from the top of the frame this value is added to obtain the starting vertical line. In the zoom mode the value H is added and is supplied to adder 331 so that the bottom of the picture will be H lines from the top of the picture since every line is used in the zoom and wide screen modes.

The divide by two flipflop 352 determines whether every line or every other line is displayed by controlling the VENA signal via gate 353. In the standard mode it changes state upon every horizontal sync pulse so only every other line is used. If permanently enabled, AND gate 353 is controlled solely by the output of flipflop 350 and every raster line is utilized. Connected to the sync signals, the output of comparator 342 and the outputs of the flipflop 350 are a pair of AND gates 360 and 362. These AND gates generate outputs corresponding to the top and bottom lines of the display, respctively. These signals are utilized by the video interface circuitry.

The VENA signal on line 354 is one input to AND gate 364. The other two inputs to this gate are the horizontal enable signal (HENA) and a clock signal (VCLK) which is either MCLK or one-half MCLK depending upon the mode of operation as explained in the next section.

Horizontal Position Control 204

Referring now to FIG. 9B, the horizontal position control circuitry is disclosed. As can be readily appreciated, this circuit is substantially identical to the vertical position control circuit in both structure and operation. A detailed description therefore will not be given except with respect to those elements which differ from the vertical position control circuit. A joy stick 400 permits the scoreboard operator to select the portion of the video frame to be displayed as between the extreme left and right positions. The voltage generated by the joy stick is amplified and a limiter is provided to clip the voltage in the standard mode. The output from the limiter is provided to comparator 406 which controls the operation of the counter 408 in a manner identical to the vertical position control. Countr 408 is reset by the vertical sync signal. The point at which the counter stops represents the new starting position for a horizontal line and is provided to a series of latches 410 and to a subtract and compare circuit 412. The new value is utilized if it differs by more than a selected value, otherwise it is discarded. The data stored in the latches 410, new or present, is applied to a switch matrix identical in construction to the vertical switch matrix and includes switches 414, 416, 418 and adders 420 and 422.

In the standard mode switch 414 loads a zero into adder 420 so that the beginning of a horizontal line is controlled by the position data stored in the latches 410. The output of added 420 goes via switch 418 to a comparator 426 which compares this data against the count in dot counter 428. Dot counter 428 is clocked by the MCLK signal and begins counting after an initial hold off period to insure counting begins at the start of picture data after the horizontal sync occurs.

The hold off signal on line 228 maintains the dot counter 428 reset for approximately 60/MCLK pulses for that purpose. As soon as the hold off signal terminates the dot counter initiates its counting sequence. When the value in the dot counter is equal to the value provided to the comparator 426, flipflop 430 is toggled. This changes the input to the comparator to the B value of switch 418 which determines the end of the horizontal line. The B input is a value produced in added 422 which sums the output of adder 420 and a value dependent upon operating mode. Table I sets forth the inputs to switches 414 and 416.

Table I

| Mode | Switch 414 | | Switch 416 | |
|---|---|---|---|---|
| | A | B | A | B |
| Standard | 0 | — | 2W | — |
| Zoom | — | ½W | — | W |
| Wide Screen | 0 | — | 2W | — |

In the standard mode switch 414 adds zero to adder 420 while switch 416 adds two times the frame width (W) to adder 422. Thus, the display starting point is at the left side of the frame and the ending point is at the right side of the frame. Two W is required for a full display since the clock frequency for the standard mode is only one-half the MCLK frequency as will be indicated presently. This is also the input for the wide screen mode where an elongated display board is used and it is desired to display over the entire width of the board which, for discussion purposes, is assumed to be twice the width of the standard board.

In the zoom mode the inputs to switches 414 and 416 are one-half W and W, respectively. This produces the zoom display in which a portion of the horizontal information is utilized depending upon the positioning of the joy stick control. It will be recalled that during the zoom mode the clock frequency is double that of the standard mode and thus the value W is loaded as the stopping point rather than 2W, as utilized for the standard and wide screen modes.

Except for these differences the switch matrix, a comparator 426 and the flipflop 430 operate in substantially the same manner as the corresponding elements of the vertical position control to produce a horizontal enable signal on line 430 which constitutes a second input to the AND gate 364.

In the zoom mode the input to switch 414 is ½W since only a portion of the width of the video frame is to be displayed and the clock frequency is double that of the standard mode. Flipflop 430 controls switch 418 to obtain the starting and ending points for each horizontal line in the same fashion that flipflop 350 does to obtain the position of the first and last lines.

The MCLK signal is inverted by inverter 434 and utilized to clock flipflop 430 and is also provided as one input to AND gate 436. The second input to gate 436 is provided from the divide by two flipflop 438 which is enabled (Q output high) on every other count during the standard mode to provide a clock frequency of ½ MCLK while it is always enabled during the zoom and wide screen modes. Thus, the output from gate 436 is either MCLK or ½ MCLK depending on mode. The output from gate 436 is the third and final input to gate 364 and this output is denominated VCLK. In effect, VCLK is equal to MCLK in the zoom and wide screen modes while it equals ½ MCLK in the standard mode. The VCLK signal is provided on line 440 to the A to D converter 282 and as an enabling input to AND gates 290 for clocking data to the D to A converter 292 and the monitor. The VCLK signal is also utilized by the video interface as indicated.

Summarizing the circuitry of FIGS. 9A and B, it will be seen that the video converter and display control circuit permits selection of the mode of operation either standard, wide screen or zoom display and adjusts the clock rates appropriately to accommodate the desired display mode. In addition, the joy stick controls permit the scoreboard operator to select those portions of the video frame which will be displayed while discarding the remaining video data. In the wide screen mode an enlarged and elongated display is produced while maintaining a correct aspect ratio by increasing the sampling rate of the video information in correspondence with the increase in length (pixels) of the horizontal lines but discarding additional top and bottom lines so that the data may be displayed on an elongated board of standard height. In the zoom mode an enlarged display of a segment of the video frame which is of interest is provided over the entire board display.

Timing Diagram

Figure 10:
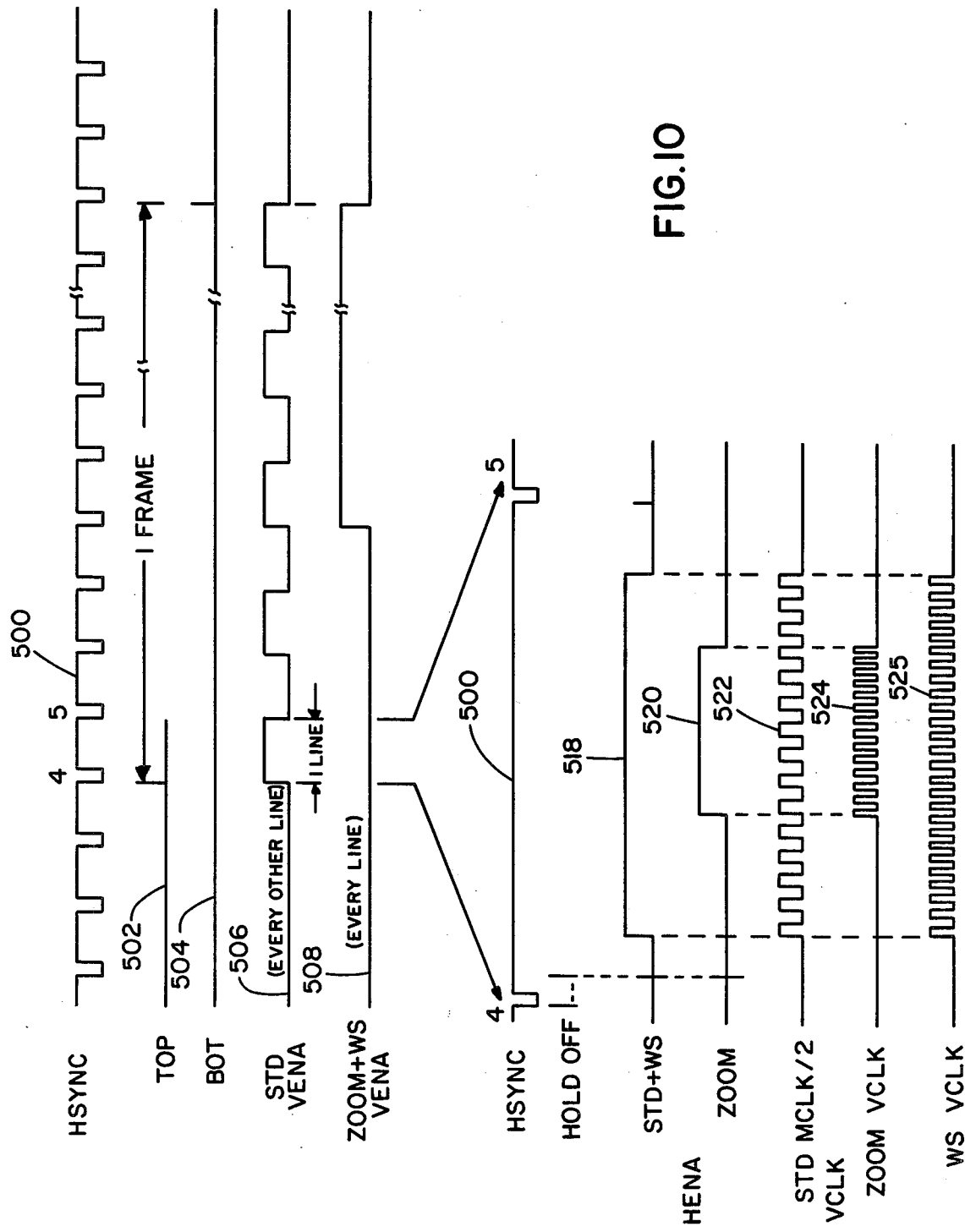
FIG. 10 is a waveform diagram useful in understanding the operation of the invention.

Referring now to FIG. 10, a waveform or timing diagram is illustrated which is useful in understanding the operation of the system according to the invention. The horizontal sync waveform 500 produces a pulse at the beginning of each horizontal line. The top and bottom signals 502 and 504 are generated by the AND gates 360 and 362 of FIG. 9A and indicate the occurrence of the top and bottom horizontal lines representing one complete video frame. In the standard mode, waveform 506 is the vertical enable signal, VENA, produced on line 354 of FIG. 9A and, as can be seen, the V enable signal is high for every other line of the field. The zoom and wide screen modes utilize every line of the field and, therefore, the VENA signal 508 in those modes stays high until the end of the frame.

The lower portion of FIG. 8 includes a number of additional waveforms on an enlarged scale in order to make the representation more meaningful. The horizontal zync waveform 500 is illustrated as well as the horizontal hold off signal provided on line 228 of FIG. 4B which prevents the dot counter from initiating its counting sequence until video information is present. The HENA signal, in the standard and wide screen modes, is enabled and disabled at values determined by the comparator 426 and remains high for substantially the entire width of the video frame to be displayed. In the zoom mode HENA 520 comes up at a later point in time and is of shorter duration in view of the fact that only a portion of each line is utilized.

Waveform 522 is the VCLK signal utilized in the standard mode, namely, the master clock divided by two while waveforms 524 and 525 are the VCLK signals utilized with the wide screen and zoom modes. The difference between the wide screen and the zoom mode is readily apparent from an inspection of waveforms 524 and 525. It will be seen that in the zoom mode the VCLK signal is generated only for the smaller window created by the zoom HENA signal while in the wide screen mode the VCLK signal is utilized over the larger window produced by the standard HENA waveform 518.

It is believed that the foregoing description provides a complete description of the invention. However, it is believed desirable to provide a brief operating summary of the system which follows.

In a typical use of the invention the system operator will select the operating mode wherein information is received from the video source 48, digitized by the video converter and provided via the video interface to the display buffer 30. The system will then cause the information stored in the display buffer to be transmitted via the display interface 24 to the scoreboard displays. This operation will be repeated at a rate on the order of 30 times per second so that motion of objects in the display appears smooth to the spectators viewing the display. That is, on the order of 30 times per second a complete frame of video data is digitized, stored in the display buffer, recalled from the display buffer and transmitted to the scoreboard display. Alternately, as indicated in the background portion of the specification, it is possible to transfer data from the computer system storage to the display buffer for transmission out to the scoreboard or for transmission to the video interface for display on the monitor. By operation of the joy sticks in the video converter 46 it is possible to select portions of a video frame for display on the scoreboard in any of the three modes of operation, standard, zoom or wide screen. Thus, for example, in a baseball game it is possible to isolate a portion of a picture which is of interest and display only that portion on the scoreboard displays. By use of the previewing feature in conjunction with monitor 50 it is possible to correctly position the joy sticks prior to transmitting the data to the scoreboards.

While we have shown and described embodiments of this invention in some detail, it will be understood that this description and illustrations are offered merely by way of example, and that the invention is to be limited in scope only by the appended claims.

We claim:

1. A high speed system for displaying a video image on a plurality of variable intensity display devices, said image reproducing a frame of video information received in raster form from a video source comprising:
   (a) video converter means for receiving said video information from said source and converting it into digital data,
   (b) a display buffer memory capable of storing the digital data representing said video frame,
   (c) a video interface receiving said digital data and transmitting it to said display buffer, said interface including means for sequentially addressing the storage locations in said buffer memory,
   (d) first bus means for connecting said video interface to said buffer,
   (e) a display interface for retrieving said digital data from said buffer and transmitting it to said display devices,
   said display interface including address means for extracting the data from said buffer in a sequence different than the sequence used to store the data in the buffer,
   (f) computer means for controlling the transfer of data between the interfaces, the display buffer, the converter and the display devices.

2. The system according to claim 1 wherein said computer means includes:
   (a) a digital computer and system interface, and
   (b) second bus means for linking said video and display interfaces to said computer via said system interface.

3. The system according to claim 2 wherein said system further includes a computer interface linking the first and second bus means whereby digital data may be transferred between the computer and the display buffer memory.

4. The system according to claim 1 wherein said system further includes a computer interface linking said computer means and said first bus means whereby data may be transferred between the computer means and the display buffer.

5. The system according to claim 1 wherein said video interface also includes means for receiving data from said display buffer memory via said first bus means and transmitting it to said converter means,
   said system further including a video monitor connected to said converter means whereby the digital data received by the converter from the video interface may be reconverted to video information and displayed on said monitor for previewing purposes.

6. The system according to claim 1 wherein said display buffer is a random access memory.

7. The system according to claim 1 wherein said converter means includes:
   (a) means for producing digital data representative of all or only a selected portion of said video frame at a selctable conversion rate, and
   (b) means for choosing the portion of said frame to be digitized,
   said system capable of at least two modes of operation, a first mode producing a magnified or enlarged image of only a selected portion of said video frame on said display devices and a second mode reproducing substantially all of said video frame on said display devices without enlargement.

8. The system according to claim 7 wherein said means for producing includes:
   (a) vertical means for selecting which raster lines in said frame are to be digitized,
   (b) horizontal means for selecting the portion of each selected raster line which is digitized, and
   (c) clock means for controlling the number of picture elements produced by said converter for each raster line.

9. The system according to claim 8 wherein the means for choosing includes: means for controlling the operation of said vertical and horizontal means to cause said vertical and horizontal means to choose the desired raster lines and the desired portion of each selected line to be digitized.

10. A high speed system for displaying a video image on a plurality of variable intensity display devices, said image reproducing a frame of video information received in raster form from a video source, said system capable of at least two modes of operation, a first mode producing a magnified or enlarged image of only a selected portion of said video frame on said display devices and a second mode reproducing substantially all of said video frame on said display devices without enlargement, said system comprising:
    (a) video converter means for receiving said video information from said source and converting it into digital format, said converting means including means for producing digital data representative of all or a selected portion of said video frame at a selectable conversion rate,
    (b) means for choosing the portion of said frame to be digitized,
    (c) a display buffer memory capable of storing the digital data representing the selected portion of said video frame,
    (d) a video interface receiving said digital data and transmitting it to said display buffer, said interface including means for sequentially addressing the storage locations in said buffer memory,
    (e) first bus means for connecting said video interface to said buffer,
    (f) a display interface for retrieving said digital data from said buffer and transmitting it to said display devices, said display interface including address means for extracting the data from said buffer in a sequence different than the sequence used to store the data in the buffer,
    (g) computer means for controlling the transfer of data between the interfaces, the display buffer, the converter and the display devices.

11. A video to digital converter for converting a frame of analog video information received in raster fashion into digital data suitable for use in reproducing said frame on a display device comprising:

(a) an analog to digital (A/D) converter receiving said video information and digitizing it to produce said digital data when enabled, (b) means for enabling said A/D converter to produce said digital data, said enabling means causing said analog to digital converter to digitize all or only selected portions of said video frame at a selectable data conversion rate, (c) means for choosing the portion of said frame to be digitized, said enabling means capable of at least two operating modes, a first mode producing data for reproducing an enlarged or magnified image of only a selected portion of said video frame on said display device, and a second mode producing data for reproducing substantially all of said video frame on said display device without enlargement.

12. The converter according to claim 11 wherein said enabling means includes:

(a) vertical control means for selecting the raster lines in said frame which are to be digitized, (b) horizontal control means for selecting the portion of each selected raster line which is to be digitized, (c) clock means, (d) gate means for enabling and disenabling said A/D converter responsive to said vertical and horizontal control means and for controlling the data conversion rate of said A/D converter responsive to said clock means.

13. The converter according to claim 12 wherein said means for choosing includes:

(a) manually operable vertical and horizontal joy stick control means for producing voltages corresponding to the desired starting raster line and the desired starting picture element on each such line, respectively, (b) means for digitizing said voltages to produce position data, (c) means for applying said position data to said vertical and horizontal control means thereby to cause said control means to select the desired portion of said frame for digitizing.

14. The converter according to claim 13 wherein each of said means for digitizing said voltages includes:

(a) a counter, (b) a digital to analogue converter producing a stick voltage porportional to the value of said counter, and (c) a comparator, comparing one of the said joy stick voltages and the voltage from said digital to analogue converter, said comparator disabling said counter when the voltages are equal, the value of the counter, upoin being disabled, producing the desired position data.

15. The converter according to claim 13 wherein each of said means for applying includes:

(a) a plurality of latches to which said position data is applied, (b) means for comparing the position data against previous position data stored in said latches, and (c) means responsive to said comparison to strobe the new position data into said latches when said new data differs from the previous data by a selected amount, whereby jitter in the display system is substantially reduced by ignoring small changes in position which do not exceed said selected amount.

16. The converter according to claim 12 wherein said vertical control means includes:

(a) switch means responsive to said choosing means for producing binary numbers representative of the desired starting and ending raster lines in said frame which are to be digitized, (b) means for counting the raster lines in said frame and producing a binary number representative of the current line, (c) means for comparing the current line number against the numbers produced by said switch means and producing outputs to said gate means indicative of the occurrence of the selected starting and ending raster lines.

17. The converter according to claim 12 wherein said vertical control means includes selectable means for inhibiting said gate means during every other raster line.

18. The converter according to claim 17 wherein said selectable means includes a divide by two flipflop which inhibits said gate means during every other raster line when selected.

19. The converter according to claim 12 wherein said horizontal control means includes:

(a) switch means responsive to said choosing means producing binary numbers representative of the starting and ending picture elements of each raster line to be digitized, (b) means for counting the picture elements in each line and producing a binary number representative of the current picture element, (c) means for comparing the current picture element number against the numbers produced by said switch means and producing outputs indicative of the starting and ending picture elements to said gate means.

20. The converter according to claim 19 wherein said horizontal control means includes selectable means for inhibiting said gate means during every other clock pulse from said clock means.

21. The converter according to claim 20 wherein said selectable means includes a divide by two flipflop which inhibits said gate means during every other clock signal only when selected.

* * * * *